United States Patent
Gray et al.

(10) Patent No.: US 8,467,298 B2
(45) Date of Patent: Jun. 18, 2013

(54) APPLYING A TABLE-LOOKUP APPROACH TO LOAD SPREADING IN FORWARDING DATA IN A NETWORK

(75) Inventors: Eric Ward Gray, Pitman, NJ (US); David Ian Allan, San Jose, CA (US); Scott Andrew Mansfield, Evans City, PA (US); Joel Halpern, Leesburg, VA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 147 days.

(21) Appl. No.: 13/091,066

(22) Filed: Apr. 20, 2011

(65) Prior Publication Data
US 2012/0176904 A1 Jul. 12, 2012

Related U.S. Application Data

(60) Provisional application No. 61/431,250, filed on Jan. 10, 2011.

(51) Int. Cl.
*H04L 12/26* (2006.01)
*G06F 15/173* (2006.01)

(52) U.S. Cl.
USPC .......................................... 370/238; 709/223

(58) Field of Classification Search
None
See application file for complete search history.

(56) References Cited

U.S. PATENT DOCUMENTS
2012/0120803 A1 * 5/2012 Farkas et al. ................. 370/235

* cited by examiner

*Primary Examiner* — Clemence Han
(74) *Attorney, Agent, or Firm* — Blakely Sokoloff Taylor & Zafman, LLP

(57) ABSTRACT

A method provides load distribution that selects one of a set equal cost paths for each flow that minimizes imbalance in the distribution of flows across the set of equal cost paths. The method includes calculating the set of equal cost paths to each destination node, generating a set of next hop discriminators, each next hop discriminator to uniquely identify one of the equal cost next hops, populating the load distribution table by storing, according to a distribution mechanism, in each load distribution table entry one of the next hop discriminators from the set of next hop discriminators, receiving a first PDU from a first flow and performing a lookup of one of the next hop discriminators in the load distribution table by using values at the bit locations of the first PDU directly as an index into a CAM.

15 Claims, 7 Drawing Sheets

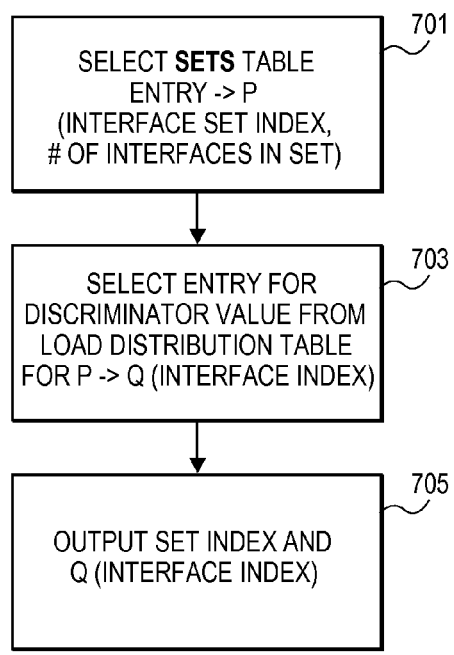
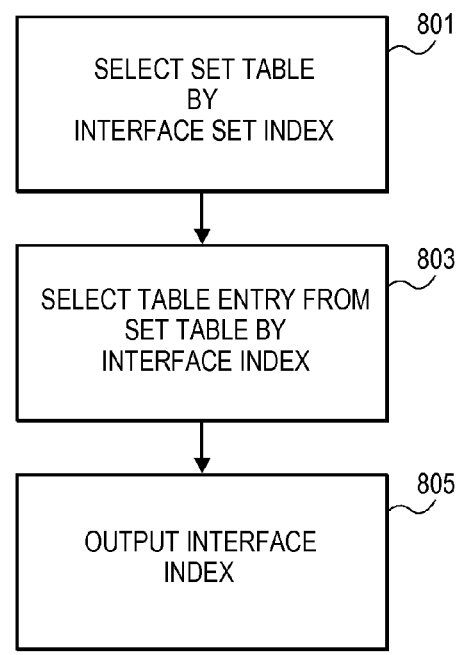
FIG. 7
FIG. 8

US 8,467,298 B2

APPLYING A TABLE-LOOKUP APPROACH TO LOAD SPREADING IN FORWARDING DATA IN A NETWORK

CROSS REFERENCE TO RELATED APPLICATION

The present application claims priority from U.S. Provisional Patent Application No. 61/431,250, filed on Jan. 10, 2011.

FIELD OF THE INVENTION

The embodiments of the invention relate to a method and system for improving load distribution in a network. Specifically, the embodiments of the invention relate to the use of a load distribution table populated with next hop discriminators to improve load distribution in terms of more even spreading of a load across equal cost paths and the speed that a network element can implement the improved spreading of the load.

BACKGROUND

A prevalent load spreading technique today is the spreading of traffic over a set of equal cost paths to a destination node referred to as equal cost multi-path (ECMP). However, in some implementations ECMP can have limitations in supporting operation, administration and management (OAM) functions and difficulty in evenly spreading a traffic load in asymmetrical topologies. ECMP has been implemented by using hashing algorithms and/or modulo operations on labels for multi-protocol label switching (MPLS) traffic, virtual local area network IDs (VLAN IDs) for layer 2 technology, or header information from packets for layer 3 technology. These hashing algorithms and modulo operations are utilize to spread traffic streams over the number of equal cost next hops in a network as a next hop selection mechanism for forwarding traffic.

When a network forwarding device supports ECMP and this capability is enabled and there are multiple paths with the same (or similar) cost towards a specific destination, the network forwarding device will attempt to divide the load evenly across the set of equal cost next hops. Numerous techniques exist for distributing traffic over these equal cost next hops, those techniques with the most desirable properties are those that preserve flow ordering among protocol data units (PDUs), that is, all PDUs that have similar characteristics such as source, destination and header information, can be considered part of the same "flow" and preserving their ordering indicates that they arrive at their destination in the same order that they were sent by the source.

Existing load spreading techniques rely on the use of some form of hashing process that is applied per-PDU by a network forwarding device. Using such hashing techniques allows for large-scale determination of a collection of "flows" based on key fields in a PDU header. For example, a subset of source address and destination address bits can be used as input to a hashing function to group "flows" in such a way that all PDUs traveling from a particular source to a particular destination are considered part of the same gross-flow and forwarding all PDUs that are part of this gross-flow guarantees that no PDU within a subset flow will follow a different path and as a consequence potentially arrive out of order from the rest of the flow.

ECMP and similar hashing-based techniques have limitations in that in any irregular network or in any regular network that is in a failure scenario the load is difficult to evenly distribute across the plurality of equal cost paths. This is because any particular hashing scheme that is selected in an attempt to evenly distribute PDU traffic across the set of paths is selected without regard to the actual layout of the network beyond the immediate set of next hops. The hashing scheme is typically not changed dynamically in a network failure scenario due to the disruption that would be caused, as a result the hashing scheme selected may not produce a roughly even load distribution in the changed network topology.

All hashing schemes are subject to some degree of correlation. The simpler (and thus easier to apply to in-transit PDUs) a hashing scheme is, the more likely correlation is to be a problem. Correlation with these hashing schemes is a phenomenon where a particular path is disproportionally selected by a hashing scheme due to similarities in properties in the PDU traffic that the hashing scheme utilizes for path selection. Elements of the hashing scheme (such as the specific algorithm chosen, the specific bits used as input, etc.) can reduce, but not eliminate the observed correlation for any specific network and topology. Correlation can lead to serious imbalances in distribution of the PDU traffic load, e.g. where one subset of potential paths carries some integral multiple greater than one of the load carried by another subset of the available paths. An ideal hashing scheme would result in a traffic distribution that would appear to be completely random, while retaining the desirable property of consistently forwarding any particular flow along the same path. Attempts to achieve this aim have consistently resulted in approaches that do not achieve this goal for at least some potential forwarding scenarios and/ or these hashing schemes are extremely complicated in implementation and result in delays in PDU forwarding as an artifact of the hashing scheme used.

SUMMARY

A method implemented in a network element in a network between a source node and a destination node, the network element to provide load distribution by distributing the forwarding of flows across a set of equal cost paths to the destination node, wherein each of the flows is a set of protocol data units (PDUs) having shared characteristics that are transmitted across the network between the source node and the destination node, wherein the load distribution selects the next hop for one of the equal cost paths for each of the flows from the set of equal cost paths that minimizes imbalance in the distribution of flows across the set of equal cost paths, the method comprising the steps of: calculating the set of equal cost paths to the destination node of each flow; generating a set of next hop discriminators for the set of equal cost paths, each next hop discriminator in the set of next hop discriminators to uniquely identify one of the next hops transited by an equal cost path; dimensioning a load distribution table based on a number of bit locations within a PDU format used by the PDUs of the flows, wherein the bit locations are chosen so that values in the those bit locations will distinguish the flows from each other; populating the load distribution table by storing, according to a distribution mechanism, in each load distribution table entry one of the next hop discriminators from the set of next hop discriminators; allocating entries in a content addressable memory (CAM) for the load distribution table according to the dimensioning; receiving a first PDU at the network element from a first flow being sent by the source node across the network to the destination node; performing a lookup of one of the next hop discriminators in the load distribution table by using values at the bit locations of the first PDU directly as an index into the CAM entries allocated for the load distribution table; and forwarding the first PDU through a network interface corresponding to one of the paths from the set of equal cost paths to the destination node that is uniquely identified by the next hop discriminator looked up in the load distribution table.

A network element in a network between a source node and a destination node, the network element to provide load distribution by distributing the forwarding of flows across a set of equal cost paths to the destination node, wherein each of the flows is a set of protocol data units (PDUs) having shared characteristics that are transmitted across the network between the source node and the destination node, wherein the load distribution selects the next hop for one of the equal cost paths that minimizes imbalance in the distribution of flows across the set of equal cost paths, the network element comprising: a receive queue to store a first PDU of a first flow received over the network from the source node; a network processor to generate a load distribution table for flows sent by the source node across the network, wherein the network processor calculates the set of equal cost paths to the destination, generates a set of next hop discriminators for the set of equal cost paths, each next hop discriminator to uniquely identify a next hop transited by one of the set of equal cost paths, the network processor selects bit locations to input into a load distribution table, dimensions the load distribution table based on the number of bit locations, and populates the load distribution table with a distribution mechanism that creates next hop discriminators for each cell of the load distribution table; a load distribution table memory to store the load distribution table after being generated and populated by the network processor, wherein the load distribution table is a content accessible memory (CAM), a lookup module to perform a lookup of a next hop discriminator in the load distribution table using the bit locations in the received first PDU; and a send queue to store the first PDU to be forwarded along a path selected from the set of equal cost paths to the destination node, wherein the path corresponds to the next hop discriminator output by the lookup table.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 7 is a flowchart of one embodiment of a load distribution set index look-up process.

FIG. 8 is a flowchart of one embodiment of a forwarding interface selection process.

DETAILED DESCRIPTION

Figure 1:
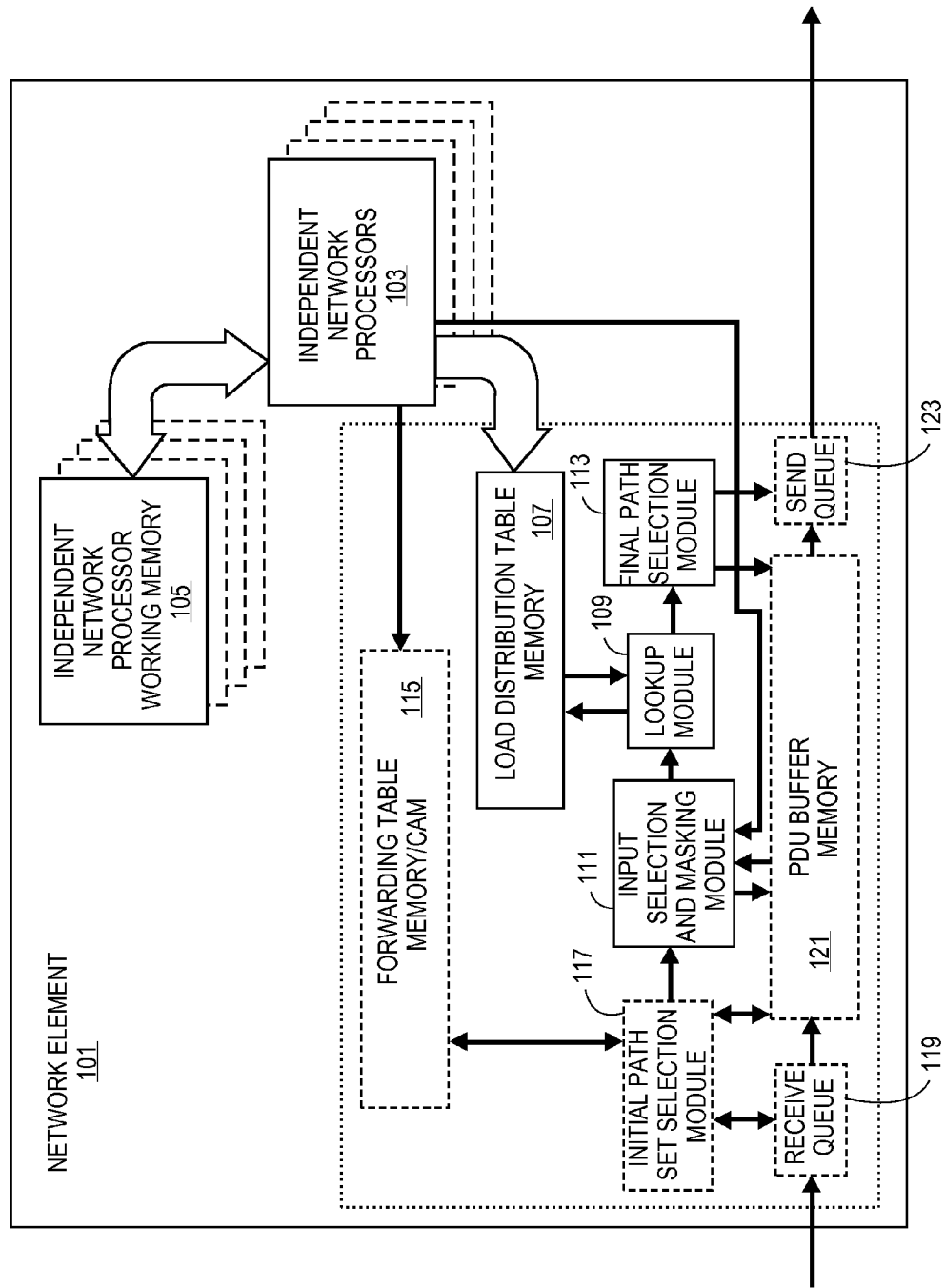
FIG. 1 is a diagram of one embodiment of a network element.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1 and 3. However, it should be understood that the operations of the flow diagrams can be performed by embodiments of the invention other than those discussed with reference to FIGS. 1 and 3, and the embodiments discussed with reference to FIGS. 1-3 can perform operations different than those discussed with reference to the flow diagrams of FIGS. 2 and 4-8.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

The embodiments of the present invention provide a method and system for avoiding the disadvantages of the prior art. The disadvantages of the prior art are that all hashing schemes utilized for load distribution are subject to some degree of correlation. The simpler and thus easier to apply to in-transit protocol data units (PDUs) a hashing scheme is, the more likely correlation is to be a problem. Correlation with these hashing schemes is a phenomenon where a particular path is disproportionately selected by a hashing scheme due to similarities properties in the PDU traffic that the hashing scheme utilizes for path selection. Elements of the hashing scheme, such as the specific algorithm chosen, the specific bits used as input, etc., can reduce, but not eliminate the observed correlation for any specific network and topology. Correlation can lead to serious imbalances in distribution of the offered PDU traffic load, e.g. where one subset of potential paths carries some integral multiple greater than one of the load carried by another subset of the available paths. An ideal hashing scheme would result in a traffic distribution that would appear to be completely random, while retaining the desirable property of consistently forwarding any particular flow along the same path. Attempts to achieve this aim have consistently resulted in approaches that do not quite achieve the goal for at least some potential forwarding scenarios and/or are extremely complicated in implementation, resulting in delays in PDU forwarding as an artifact of the scheme used.

The embodiments of the invention overcome these disadvantages of the prior art. The disadvantage of the prior art are avoided by using pre-loaded next hop discriminator information in a load distribution table that can then be used directly to determine the path used by each PDU. When equal cost multi-path (ECMP) or a similar load-spreading scheme is either desired or required, the mechanism used to accomplish the load spreading is based on a table lookup, as opposed to use of a hashing algorithm. The table lookup can be implemented as a multi-stage table lookup. The use of a table lookup and more specifically a multi-stage table lookup allows for a much larger number of values to be incorporated in the over-all processing where the values are generated with randomization algorithms of sufficient quality and complexity that are not be suitable for real-time operation, but that can reduce correlation over hashing algorithm based implementations that are practical to implement in a forwarding engine.

The table used to determine which of multiple outgoing network interfaces will be used for a given PDU and can be populated using any arbitrarily complex computation scheme, referred herein as a "distribution mechanism," as the table-loading process does not impact the steady-state PDU forwarding in any way. As a result, it is possible to eliminate any form of correlation. In addition, the load distribution table can be dimensioned in a way that is convenient for the lookup process. For example, if x-bits are taken from one field in the PDU under consideration and y-bits are taken from another, the load distribution table may be conveniently organized with $2^x$ rows and $2^y$ columns (or vice-versa). Distribution mechanisms to ensure that correlation does not exist for any specific network or topology can be arbitrarily complex as they can be applied in parallel with PDU forwarding by one or more independent network processors. All of the same techniques that could be applied to a hashing scheme (such as varying the input fields and bits used, or the specific algorithm chosen) can be similarly employed in the distribution mechanism for determination of the data to be loaded into the load distribution table, as well as how that data would be organized (dimensions to be used) in the table. In addition, the data could be deliberately altered (in ways not easily built into an algorithm) by using a "grooming process" to further eliminate correlation effects and ensure equal (or as near equal as possible) distribution of the PDU traffic load. This table lookup based approach is feasible with a relatively large number of bits across multiple bit fields.

FIG. 1 is a diagram of one embodiment of a network element. The network element includes a set of network processors 103, a set of network processor working memory devices 105, a load distribution table memory 107, a lookup module 109, an input selection and masking module 111, a final path selection module 113, a forwarding table memory or content accessible memory (CAM) 115, an initial path set selection module 117, a receiving queue 119, a PDU buffer memory 121, and a send queue 123. A 'set,' as used herein refers to any positive whole number of items including one item. Each of these components of the network element 101 can be co-located or integrated with one another in any combination and at any level from an integrated circuit to the entire network element or even multiple network elements.

A receive queue 119 is a storage device for storing incoming PDUs received on any network interface that are to be processed by the set of network processors 103. The receive queue 119 can have any size or storage capacity. Similarly, the PDU buffer memory 121 stores PDUs that are currently being processed by the network processor 103 and/or that are being prepared for forwarding. The send queue 123 is a storage device for storing PDUs that are to be transmitted on any of the network interfaces of the network element 101.

An initial path set selection module 117 interfaces with the forwarding table memory 115 to determine a set of equal cost paths for forwarding incoming PDUs. The forwarding table memory 115 stores network topological data enabling the network element 101 to determine possible paths to destination addresses in received PDUs. The forwarding table memory 115 and initial input path set selection module 117 provide a set of equal cost paths to the input selection and masking module 111. This set of equal cost paths can be output to the input selection and masking module 111 explicitly, as a set ID that one or more subsequent functions can use to determine the applicable set, or similarly output.

The input selection and masking module 111 gathers and in some embodiments masks the data which the specific path selection algorithm will use. In previous implementations, this information would then be fed to a hashing algorithm used to produce a next hop discriminator that would then be used to select a next hop from the set of possible next hops on a per-PDU basis. In the embodiments of the invention, this data is utilized to generate a load distribution table (if it doesn't already exist) and perform a lookup in the load distribution table. The input selection and masking module 111 works in combination with the load distribution table memory 107 and a lookup module 109, which replace the hashing function used in previous implementations. Also, the set of equal cost paths that are generated through the initial path set selection module 117 can be passed to the network processor to generate the load distribution table.

The network processor 103 or a set of network processors generate load distribution tables to spread the load of PDUs to be forwarded over the network. Any number of network processors 103 can be utilized in combination to generate the load distribution tables and other functions of the network element. For sake of clarity, an example with a single network processor 103 is described herein. One skilled in the art would understand that the processes and functions described herein can be divided across multiple network processors.

The network processor 103 can utilize dedicated network processor working memory 105 to execute all the functionality of the network processor 105. Any type of random access memory and any amount of random access memory can be present within the network element 101 or external to the network element 101 for use by the network processor 103.

In one embodiment, the network processor 103 generates the set of load distribution tables in the working memory 105 to be stored in the load distribution table 107. Load distribution tables to be used by the network elements are loaded into the load distribution table memory after creation and population using the distribution mechanism. After loaded into the load distribution table memory 107, the lookup module can index into them using the input from the input selection and masking module 111. The load distribution table memory 107 can be any type of storage device including random access memory. In one embodiment, the load distribution table memory 107 is a content accessible memory (CAM), where the load distribution table entries can be accessed by direct input from the lookup module 109. The load distribution table memory 107 can have any size or configuration sufficient to store the load distribution tables generated by the network processor 103.

The lookup module 109 is a discrete device or function integrated with other devices and functions of the network element 101. The lookup module 109 can receive any combination of input selection data from the input selection and masking module 111 to determine a table cell in a load distribution table containing a next hop discriminator. An index or identifier for a particular table can also be provided by the input selection and masking module 111. The next hop discriminator value of the table cell corresponding to the input from the input selection and masking module 111 is retrieved from the load distribution table memory and output to the final path selection module 113.

The final path selection module 113 receives the next hop discriminator value from the lookup table 109 and uses this value to determine a network interface that a PDU is to be forwarded through to a next hop destination that is a part of the next hop identified by the received next hop discriminator. The final path selection module 113 then provides the network interface information to the send queue 123 or manages the transmission of the send queue 123 such that the PDU is transmitted through the selected network interface.

Figure 2:
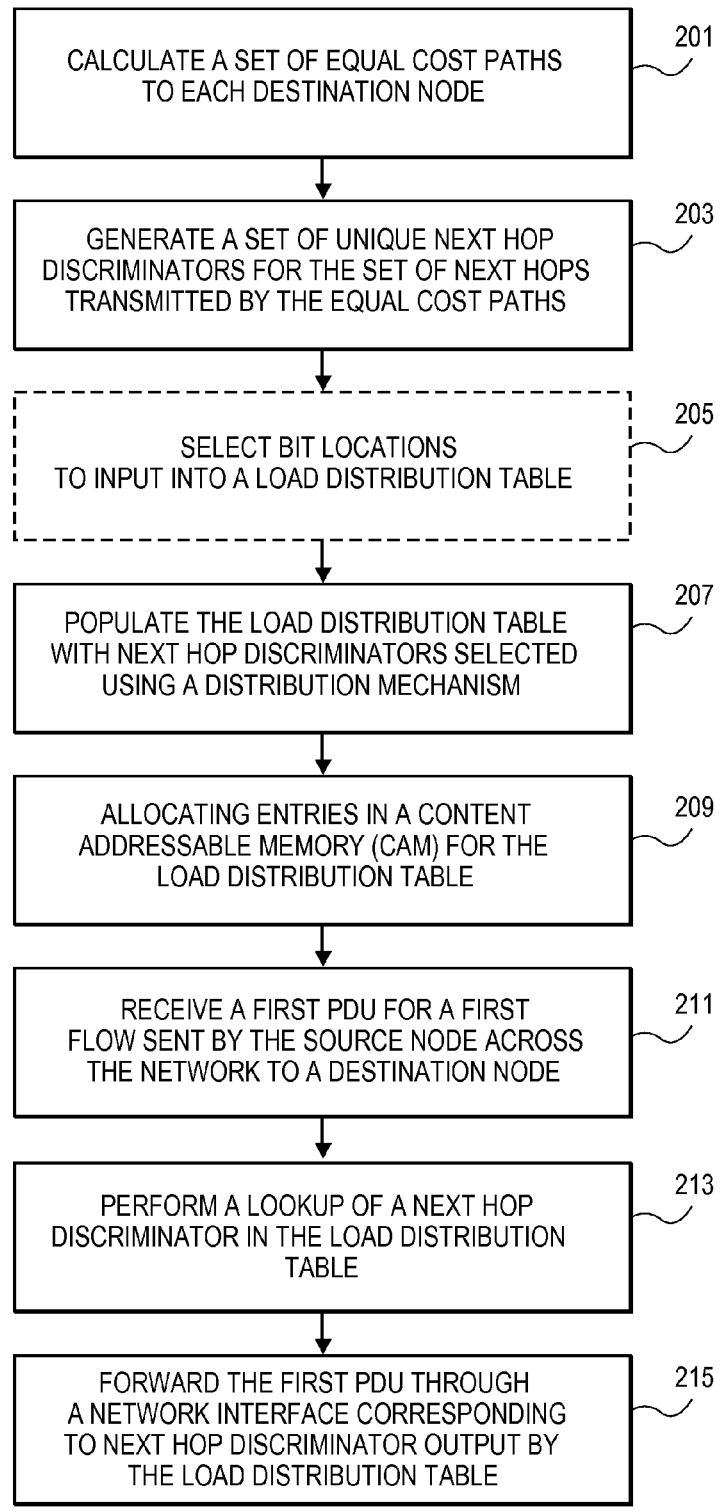
FIG. 2 is a flowchart of one embodiment of a load distribution process.

FIG. 2 is a flowchart of one embodiment of a load distribution process. The flowchart provides an example embodiment of the steps performed by a network element to forward PDUs received from a set of source nodes. One skilled in the art would understand that combinations of these steps can be performed in other sequences or in parallel and that the process is continuous in processing PDUs received at the network element.

PDUs present in the network would initially consist of routing or bridging protocol exchanges used to establish the topology of the network and the reachability of various destination nodes. Typically, no (or relatively few) user data PDUs would be presented for forwarding by the network until such time as the network topology and the reachability information has been determined by each of the network elements and advertised to source nodes that may send data PDUs across the network to the destination nodes. This is not always the case, because some traffic can be presented to the network for "default forwarding" and network "start-up" from scratch is an uncommon event.

The network element calculates a set of equal cost paths to the destination node for the first flow (Block 201). The forwarding lookup information in the forwarding table memory is examined by a network processor to determine the path-sets applicable for the network element. The forwarding information from the forwarding table memory is used as input to a process of building table contents for a load distribution table, which would be initially stored, and processed, in a network processor working memory. The number of possible paths (or next hops) for all lookup results is the input required by the table creation process.

This forwarding information is used to determine how many next hop discriminators are required for all cases and this information is then used to determine storage requirements for each cell in the load distribution table. Each next hop determined by the network processor is assigned a unique next hop discriminator (Block 203). Any format or size of identifier can be utilized for a next hop discriminator.

The network processor also selects a set of bit locations within the PDU that will be input into a load distribution table to determine a next hop discriminator (Block 205). This set of bit locations can be utilized for all subsequent traffic between the source and destination nodes or for traffic with a defined set of characteristics such as a certain quality of service. The network processor can use any process currently defined for selecting input information bits and bit locations in PDUs to be forwarded. The forwarding process utilizes these bits and bit locations, which can be selected based on available forwarding table look-up information and the network processor can alter the selected process including the relied upon bits and bit locations as available information in the forwarding table changes. The selection of bit locations and criteria is required to determine dimensioning of the load distribution table.

The load distribution table is dimensioned by the network processor according to the specific bits used as input. If the input consists of X-bits from one location and Y-bits from another location in the PDU (e.g., parts of the PDU header), then the load distribution table being constructed is dimensioned as $2^x$ rows by $2^y$ columns. Multiple load distribution tables can be defined. If multiple load distribution tables are defined, then additional information, including which load distribution table to use, must be added to the data obtainable from the forwarding table, so that this information can be forwarded along with path-set information to the input selection and masking module and lookup table by the initial path set selection module.

After the network processor dimensions the load distribution table then a load distribution table population process referred to herein as a distribution mechanism can be initiated. The load distribution table can be populated in processor working memory using any arbitrarily complex software transform as the distribution mechanism (Block 207). In the simplest case, the table would be initially be populated cell-by-cell using a random number generation and one of many reduction schemes (such as a modulo operation) to provide next hop discriminator values. In one example embodiment, next hop discriminators are determined as follows: if there are N possible next hops for a specific table, next hop discriminators would be either 1->N or 0->(N-1).

It is possible to apply one of many potential grooming functions to the populated load distribution table to improve the load distribution process. For example, after initially populating a table, the network processor can tally the occurrences of each next hop discriminator to determine if the distribution is approximately equal (e.g., with a delta of plus or minus 1 instance) and alter randomly selected cell contents. It is also possible to use weighting factors if it is desirable to deliberately produce un-equal distributions. In one embodiment, un-equal distributions can be determined to be advantageous based on available path capacity metrics. In addition, it is possible to determine appropriate weighting factors based on statistics collected by tallying actual path selection instances. In one embodiment, actual path selections can be tracked at the lookup module. This would allow for a simplistic approach to detecting, and correcting for, unequal flow groupings, since the groupings can be redistributed by altering specific next hop discriminator assignments within the load distribution table to redistribute portions of the traffic in different groups, because flow groups are formed in this approach by assigning the same next hop discriminator to multiple cells in the table.

In one embodiment, once population of the load distribution table is complete including any grooming and/or verification that is implemented in the network processor's working memory, the load distribution table is copied to the load distribution table memory (Block 209). In other embodiments, the load distribution table is constructed directly in the load distribution table memory. The input selection and masking is initialized and enabled and PDU forwarding begins or continues if it was previously in progress. This is the point at which forwarding of PDUs, becomes possible using the load distribution tables. It is unlikely that a PDU received prior to starting of the learning/computation of topology, reachability and equal cost paths would still be available for forwarding by the time preparations for forwarding are complete. It is also possible that a number of PDUs sent during preparation for forwarding will be aged out in buffering, directly discarded, or completely ignored.

In one embodiment, the process then is subsequently responsive to receiving at the network element a set of PDUs, including a first PDU for a first flow sent by a particular source node across the network toward a particular destination node (Block 211). The appropriate load distribution table is indexed by the lookup module as PDUs are processed (Block 213). If forwarding was previously in progress, reloading the load distribution table can produce some small number of instances in which one or more flows are moved from one path to another between one PDU and the next. This should be avoided when possible, but is already a recognized issue during network changes using existing techniques.

After the appropriate load distribution table is loaded into the load distribution table memory, the lookup process for a PDU (e.g., the first PDU) can be performed where the selected bits are input by the input selection and masking module into the lookup module to cause a next hop discriminator to be retrieved and output (Block 215). A final path selection function receives the next hop discriminator from the lookup module and converts the next hop discriminator information into specific activities that prepare the PDU buffer memory, send queue and internal inter-connecting switching/transport paths as required to forward the PDU on an interface.

In the worst case, this hardware lookup process would not produce a worse result than would occur using any existing hashing-based technique if there was a network transient or if the operator configured the device to use a different hashing scheme. Under steady-state conditions, this system and process has been shown to reduce correlation effects significantly.

Figure 3:
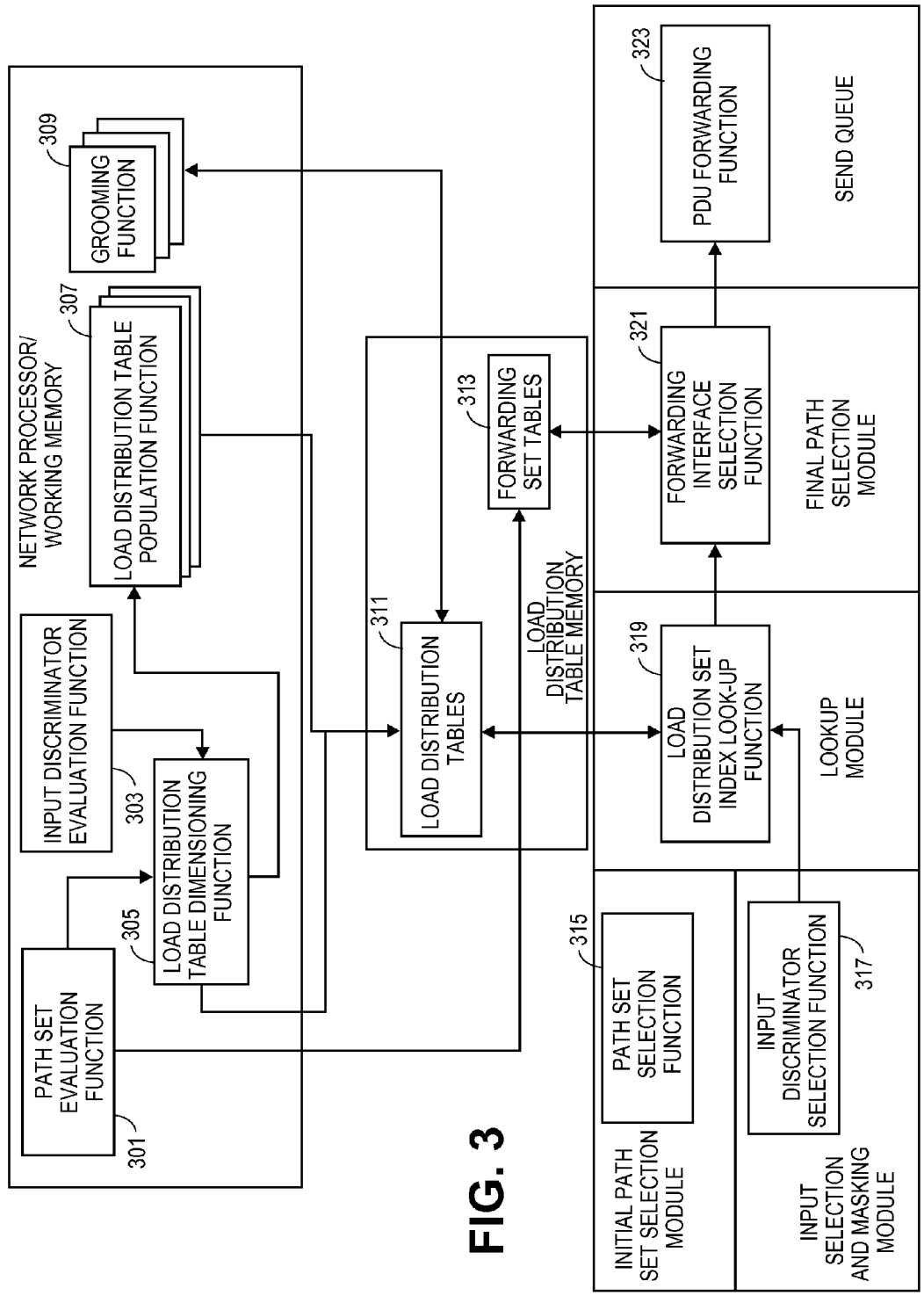
FIG. 3 is a diagram of one embodiment of the inter-relationship between functions of the network element components.

FIG. 3 is a diagram of one embodiment of the inter-relationship between functions of the network element components. In one embodiment, the path set evaluation function 301, input discriminator evaluation function 303, load distribution table dimensioning function 305, load distribution table population function 307 and grooming function 309 are executed by a network processor and utilize the network processor's working memory. The load distribution table memory stores a set of load distribution tables 311 and forwarding set tables 313. An initial path set selection module executes the path set selection function 315. The input selection and masking module executes the input discriminator selection function 317. The lookup module performs a load distribution set index lookup function 319. The final path selection module performs the forwarding interface selection function 321. The send queue executes the PDU forwarding function. One skilled in the art would understand that these functions can be performed in other combinations and by other components.

The path set evaluation function 301 receives as input the forwarding computation results and outputs the forwarding set tables and sets table. This function is described further in regard to FIG. 4. The input discriminator evaluation function 303 receives configured discriminator information and outputs dimensioning information for a load distribution table. This function is described further in regard to FIG. 5. The load distribution table dimensioning function 305 receives a sets table and cell and table information and outputs dimensioning information and lookup table index numbers. This function is described further in regard to FIG. 6.

The load distribution table population function 307 receives the load dimensioning information from the load distribution table dimensioning function 305 and constructs the load distribution table and populates the load distribution table with a distribution mechanism that can be complex transform algorithm. Possible algorithms for populating the table range from simple numbering to highly complicated algorithms such as any of a number of variations of simulated annealing. An example of the use of simulated annealing is to first populate the table through iterative generation of random numbers which are them subjected to a modulo operation and then to use some random selection method to pick a subset of all cells in the table to evaluate for optimal distribution. An evaluation function can be utilized where the goal of the evaluation function is to determine if changing a cell value would improve or degrade the over-all distribution. In one embodiment, an evaluation function might be doped (or weighted) over time with empirical observations about the number of times PDUs result in hits on particular cells.

In other embodiments, variations of simple numbering can be utilized to account for potential unfairness in selection. For example, one could use a variation where the available cells are given a ranking that corresponds to their relative likelihood of being selected and then simple numbering is performed for each cell in ranking order (all cells having the same ranking are numbered sequentially, and then this is repeated for a new ranking, until all rankings have been exhausted).

In a further embodiment network stability can be enhanced using the table as a means of minimizing the number of flows disrupted in a failure scenario (as compared to a simpler distribution method). In the event of a failure, a node adjacent to a failed link only modifies those next hop discriminators that point to the failed link to redirect traffic to surviving links in order to evenly distribute the set of flows associated with the failed link across the surviving set of next hop links. When compared to a simple "modulo the current next hop link set" distribution method, such a technique preserves ordering for those flows in the equal cost set of flows that did not transit that specific link The grooming function 309 analyzes the populated load distribution table after it is created by the load distribution population function 307. The grooming function searches for uneven distribution of next hop discriminators or updates the distribution of next hop discriminators in response to path selection metrics and load spreading metrics. The grooming function can change specific entries or can make broad changes in the load distribution table to improve load spreading.

The path set selection function 315 is executed by the initial path set selection module. The path set selection function constructs a set of equal cost paths based on the data available from the forwarding table memory. The input discriminator selection function 317 identifies the location bits in a PDU to be input into a lookup table and is executed by the input selection and masking module.

The load distribution set index lookup function 319 is performed by the lookup module. The lookup module receives a set of input location bits from a PDU and retrieves a next hop discriminator and outputs the next hop discriminator to the final next hop selection module. The load distribution set index lookup function is discussed further herein in regard to FIG. 7.

The forwarding interface selection function 321 is executed by the final path selection module. The forwarding interface selection function 321 receives a next hop discriminator from the load distribution set index lookup function and associates the next hop discriminator with a network interface through which the PDU is to be forwarded. The forwarding interface selection function output configures the send queue and PDU forwarding function 323 to forward the PDU to the next hop associated with the selected next hop discriminator through the selected network interface.

Figure 4:
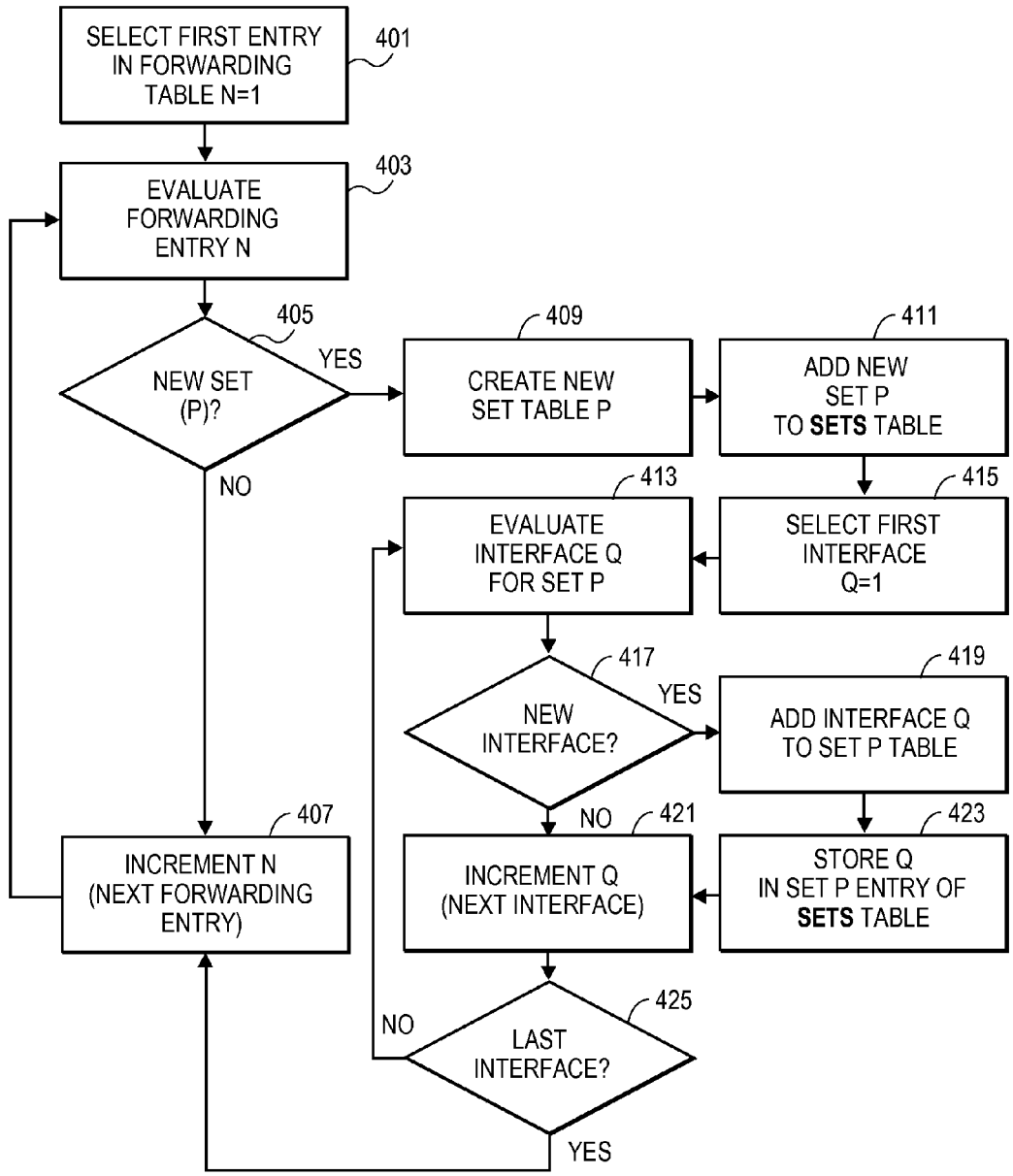
FIG. 4 is a flowchart of one embodiment of a path set evaluation process.

FIG. 4 is a flowchart of one embodiment of a path set evaluation process. The path set evaluation process maintains forwarding set tables and a sets table to be used is selecting a path for a PDU and to be associated with a set of next hop discriminators. The process is initiated to iterate through each forwarding entry starting at entry N where N=1 (Block 301). The forwarding entry is evaluated (Block 403) and a check is made to determine whether the entry corresponds to a new set (Block 405). If the entry does not correspond to a new set, then the next forwarding entry is evaluated (Block 407).

If a new set is associated with the forwarding entry, then a new set table P is created (Block 409). A new set is also added to the sets table (Block 411). Each interface is then evaluated and iterated through starting with a first interface Q where Q=1 (Block 415). The current interface Q is evaluated to determine if it corresponds to set table P (Block 413). If the interface is a new interface then it is added to the set table P (Block 419). The interface Q is also stored in the Set P entry in the Sets table (Block 423). The next interface is then examined (Block 421) until all of the interfaces have been exhausted (Block 425). The process then continues to the next forwarding entry (Block 425).

Figure 5:
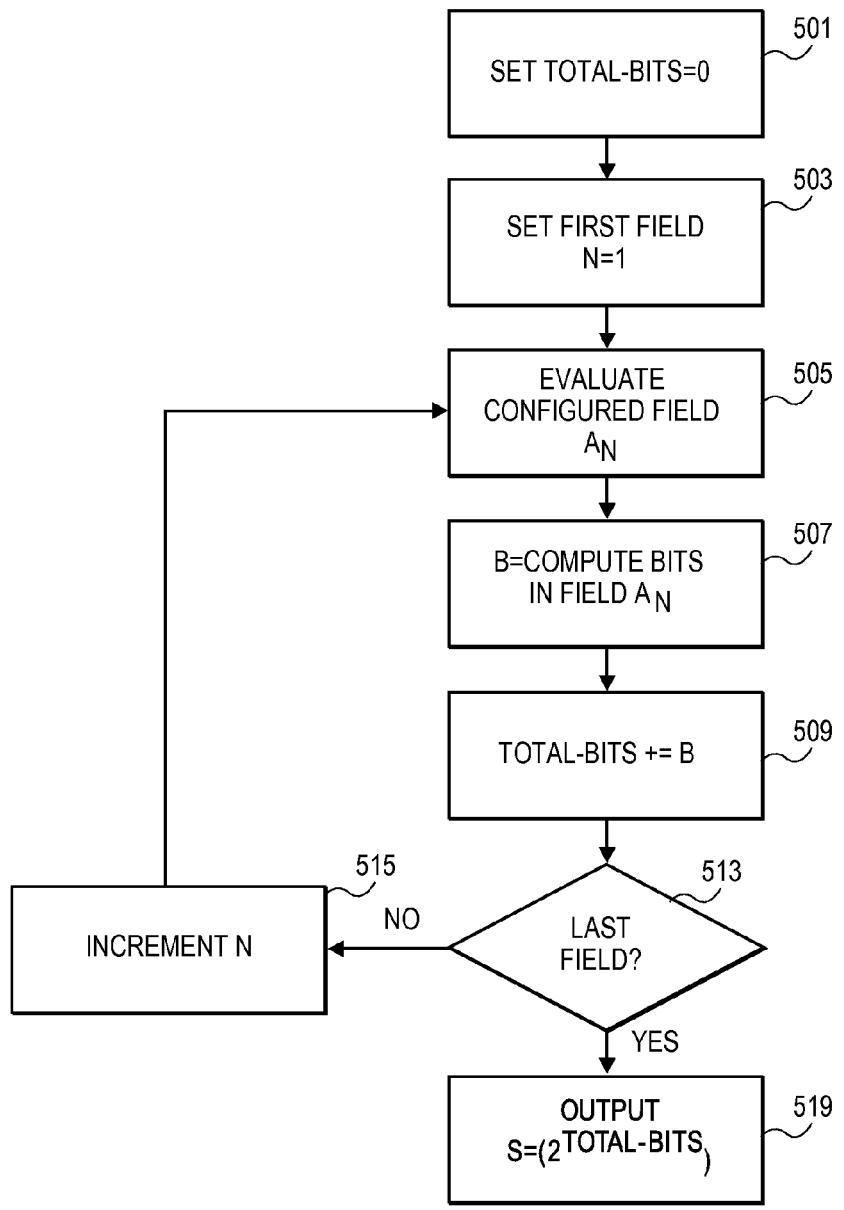
FIG. 5 is a flowchart of one embodiment of an input discrimination evaluation process.

FIG. 5 is a flowchart of one embodiment of an input discrimination evaluation process. The input discriminator evaluation function receives configuration information including discriminator information indicating the bit locations selection or criteria for selecting bit locations. The input discriminator selection function can use pre-determined information present in each PDU to provide entropy input in load-spreading. In one embodiment, the specific input derived from this function is pre-configured or selected manually.

The process begins by setting an accumulator value Total Bits to zero (Block 501). The first field of the bit locations identified in the configuration information is then examined by setting the field N to 1 (Block 503). This set of configured fields A is examined at field N (Block 505). The number of bits in this field is determined as B (Block 507). The value of B is added to the accumulator Total Bits (Block 509). A check is made to determine if all of the fields have been examined (Block 513). If all of the fields have been exhausted then the value S is output as the size of the load distribution table where S is 2 to the power of the accumulated value of Total Bits (Block 515). If all of the fields have not been exhausted then the next field is examined (Block 511).

Figure 6:
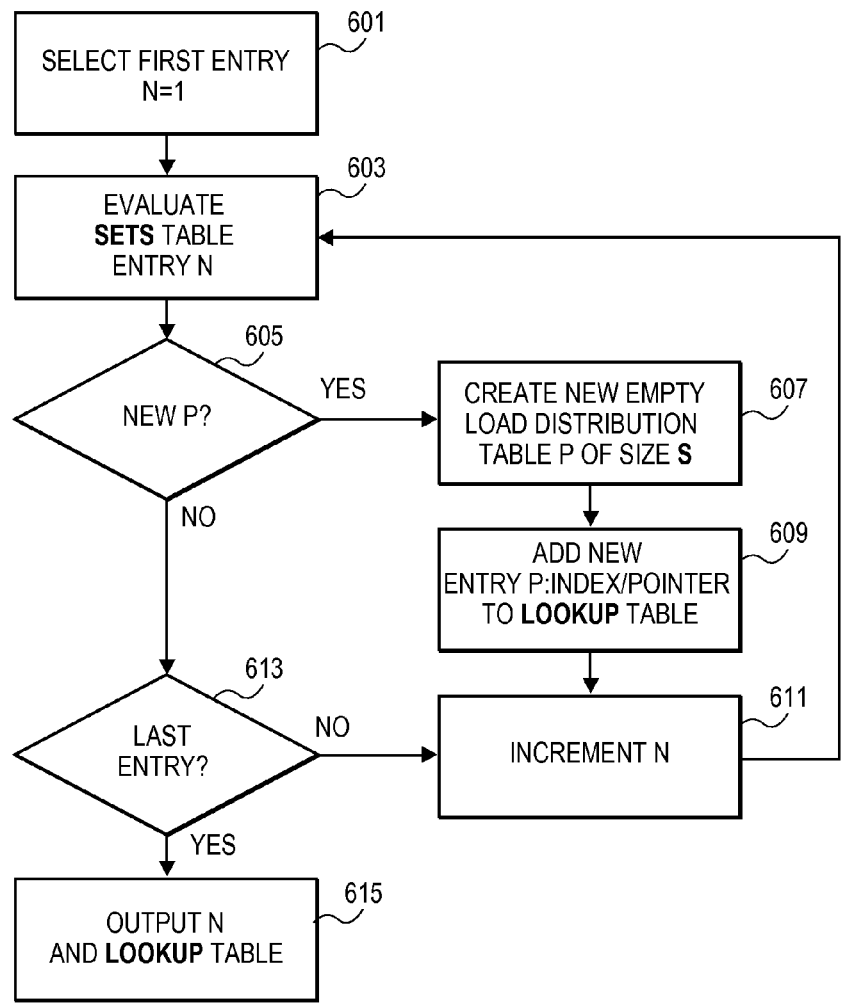
FIG. 6 is a flowchart of one embodiment of a load distribution table dimensioning process.

FIG. 6 is a flowchart of one embodiment of a load distribution table dimensioning process. The purpose of this function is to determine how many load distribution look-up tables will be required, and to pass along the number of cells in each table. In one embodiment, a field in the resulting entry retrieved from the lookup would include an interfaces "set" index.

In one embodiment, the dimensioning process is initiated by selecting first Sets table entry N (Block 601). The first entry in the Sets table N is evaluated (Block 603). If a new set table P is present (Block 605), then a new empty load distribution table is created having size S determined as described above (Block 607). A new entry P with an index or pointer is added to the lookup table (Block 609). The process then proceeds to the next entry in the sets table by incrementing N (Block 611). This process continues until each of the entries in the sets table is examined (Block 613). When all of the entries have been examined the total number of entries in the load distribution table are output (Block 615).

FIG. 7 is a flowchart of one embodiment of a load distribution set index look-up process. The purpose of this function is to determine the interface index by looking it up using the discriminator value and set index determined from the fundamental forwarding look-up, and pass along the set index and interface index. The process is initiated by first selecting a sets table with an entry P, which will include an interface set index and number of interfaces in the set (Block 701). Then the entry for the discriminator value from the load distribution table for P is selected to obtain the interface index Q (Block 703). The output set index and Q interface index are then output to the final path selection module (Block 705).

FIG. 8 is a flowchart of one embodiment of a forwarding interface selection process. The purpose of this function is to look-up the forwarding interface based on set index and interface index. The PDU forwarding function as described herein is very specific to the implementation, as it typically involves arrangement of inter-component forwarding within the device implementation, as well as modification of specific header field values. For example, new encapsulation information is provided if the media type changes from input to output interface or a new label or labels are inserted. In one embodiment, this process is performed by the final path selection module and send queue. The process can be initiated by receiving forwarding set tables, an interface set index and interface index, which are used to select a set table using the interface set index (Block 801). A table entry from the set table by selection based on the interface index (Block 803). An interface index is then output (Block 805). This output index identifies the network interface that the PDU is to be forwarded through.

In one embodiment, the system can be implemented as a set of hardware devices. In another embodiment, the system components are implemented in software (for example microcode, assembly language or higher level languages). These software implementations can be stored on a non-transitory computer-readable medium. A non-transitory "computer-readable" medium can include any medium that can store information. Examples of the computer-readable medium include a read only memory (ROM), a floppy diskette, a CD Rom, a DVD, a flash memory, a hard drive, an optical disc or similar medium.

Thus, a method, system and apparatus for efficient way to manage PDU forwarding and load spreading in a network element has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a network element in a network between a source node and a destination node, the network element to provide load distribution by distributing the forwarding of flows across a set of equal cost paths to the destination node, wherein each of the flows is a set of protocol data units (PDUs) having shared characteristics that are transmitted across the network between the source node and the destination node, wherein the load distribution selects the one of the equal cost paths for each of the flows from the set of equal cost paths that minimizes imbalance in the distribution of flows across the set of equal cost paths, the method comprising the steps of:
   calculating the set of equal cost paths to each destination node;
   generating a set of unique next hop discriminators for the set of next hops transited by the set of equal cost paths;
   dimensioning a load distribution table based on a number of bit locations within a PDU format used by the PDUs of the flows, wherein the bit locations are chosen so that values in the those bit locations will distinguish the flows from each other;
   populating the load distribution table by storing, according to a distribution mechanism, in each load distribution table entry one of the next hop discriminators from the set of next hop discriminators;
   allocating entries in a content addressable memory (CAM) for the load distribution table according to the dimensioning;
   receiving a first PDU at the network element from a first flow being sent by the source node across the network to the destination node;
   performing a lookup of one of the next hop discriminators in the load distribution table by using values at the bit locations of the first PDU directly as an index into the CAM entries allocated for the load distribution table; and
   forwarding the first PDUs through a network interface corresponding to one of the paths from the set of equal cost paths to the destination node that is uniquely identified by the next hop discriminator looked up in the load distribution table.

2. The method of claim 1, further comprising the steps of: selecting the bit locations within the PDU format to use for lookups into the load distribution table.

3. The method of claim 1, further comprising the steps of: applying a grooming function to each cell of the load distribution table storing the next hop discriminators after the populating step to improve load distribution.

4. The method of claim 3, wherein the grooming function performs the steps of:
   counting occurrences of each next hop discriminator;
   comparing counts of next hop discriminators; and
   altering next hop discriminators in the table to improve distribution.

5. The method of claim 1, further comprising the steps of: weighting a distribution of next hop discriminators in the load distribution table to produce an un-equal distribution of next hop discriminators and a desired load distribution.

6. The method of claim 1, further comprising the steps of:
   counting path selection instances to detect unbalanced path distribution; and
   altering next hop discriminators in the table to improve distribution.

7. The method of claim 1, further comprising the steps of: copying the load distribution table including populated next hop discriminators from a network processor working memory to a load distribution table memory.

8. The method of claim 1, further comprising the steps of: redirecting next hop discriminators to point to surviving next hop interfaces in the load distribution table in response to failure of a link associated with the next hop discriminators.

9. A network element in a network between a source node and a destination node, the network element to provide load distribution by distributing the forwarding of flows across a set of equal cost paths to the destination node, wherein each of the flows is a set of protocol data units (PDUs) having shared characteristics that are transmitted across the network between the source node and the destination node, wherein the load distribution selects the equal cost path that minimizes imbalance in the distribution of flows across the set of equal cost paths, the network element comprising:
   a receive queue to store a first PDU of a first flow received over the network from the source node;
   a network processor to generate a load distribution table for flows sent by the source node across the network, wherein the network processor calculates the set of equal cost paths to the destination, generates a set of next hop discriminators for the set of next hops transited by the set of equal cost paths, each next hop discriminator to uniquely identify a next hop in the set of next hops, the network processor selects bit locations to input into a load distribution table, dimensions the load distribution table based on the number of bit locations, and populates the load distribution table with a distribution mechanism that creates next hop discriminators for each cell of the load distribution table;
   a load distribution table memory to store the load distribution table after being generated and populated by the network processor, wherein the load distribution table is a content accessible memory (CAM),
   a lookup module to perform a lookup of a next hop discriminator in the load distribution table using the bit locations in the received first PDU; and
   a send queue to store the first PDU to be forwarded along a path selected from the set of equal cost paths to the destination node, wherein the path corresponds to the next hop discriminator output by the lookup table.

10. The network element of claim 9, wherein the network processor executes a grooming function on each cell of the load distribution table storing the next hop discriminators after populating the load distribution table, the grooming function to improve distribution of the next hop discriminators.

11. The network element of claim 10, wherein the grooming function executed by the network processor counts occurrences of each next hop discriminator, compares counts of next hop discriminators, and alters next hop discriminators to improve distribution of next hop discriminators in the load distribution table.

12. The network element of claim 9, wherein the network processor weights a distribution of next hop discriminators to produce an un-equal distribution of next hop discriminators in the load distribution table.

13. The network element of claim 9, wherein the network processor counts path selection instances to detect unbalanced path distribution and alters next hop discriminators in the load distribution table to improve distribution.

14. The network element of claim 9, wherein the network processor copies the load distribution table including populated next hop discriminators from a network processor working memory to the load distribution table memory.

15. The network element of claim 9, further comprising:
a final path selection module to select a network interface to forward a PDU based on the output of the lookup from the lookup module.

\* \* \* \* \*